(12) United States Patent
Beck

(10) Patent No.: US 11,402,030 B2
(45) Date of Patent: Aug. 2, 2022

(54) ADJUSTMENT OF STROKE END POSITIONS OF A PROCESS CONTROL VALVE

(71) Applicant: Bürkert Werke GmbH & Co. KG, Ingelfingen (DE)

(72) Inventor: Klaus Beck, Ingelfingen (DE)

(73) Assignee: Bürkert Werke GmbH & Co. KG

( * ) Notice: Subject to any disclaimer, the term of this patent is extended or adjusted under 35 U.S.C. 154(b) by 0 days.

(21) Appl. No.: 16/871,120

(22) Filed: May 11, 2020

(65) Prior Publication Data
US 2020/0362978 A1 Nov. 19, 2020

(51) Int. Cl.
*F16K 31/02* (2006.01)
*G05B 19/418* (2006.01)
*F16K 37/00* (2006.01)

(52) U.S. Cl.
CPC .......... *F16K 31/02* (2013.01); *F16K 37/0025* (2013.01); *G05B 19/4183* (2013.01); *G05B 19/41845* (2013.01)

(58) Field of Classification Search
CPC . F16K 31/02; F16K 37/0025; G05B 19/4183; G05B 19/41845
See application file for complete search history.

(56) References Cited

U.S. PATENT DOCUMENTS 5,433,245 A * 7/1995 Prather ............... F16K 37/0083
137/554
8,321,059 B2 * 11/2012 Carter ................... G01F 15/005
700/282

FOREIGN PATENT DOCUMENTS

EP 2646723 B1 5/2017

* cited by examiner

*Primary Examiner* — Eric Keasel
(74) *Attorney, Agent, or Firm* — Carlson, Gaskey & Olds, P.C.

(57) ABSTRACT

A method of adjusting stroke end positions of a process control valve is provided. A valve control mechanism is set up to continuously determine an actual position value from a travel-measurement system value acquired by a travel-measurement system, taking a first travel-measurement system final value and a second travel-measurement system final value into account. The method comprises the recognition of a first stroke end position when the process control valve is fully closed, and the recognition of a second stroke end position when the process control valve is fully open. The method further comprises the storage of the travel-measurement system value corresponding to the first stroke end position as the first travel-measurement system final value, and the storage of the travel-measurement system value corresponding to the second stroke end position as the second travel-measurement system final value. The process control valve is a component of a process plant, and the steps of an associated process are carried out during operation of the process plant. The disclosure further relates to a corresponding program code, to a valve control mechanism, and to a process control valve.

9 Claims, 5 Drawing Sheets

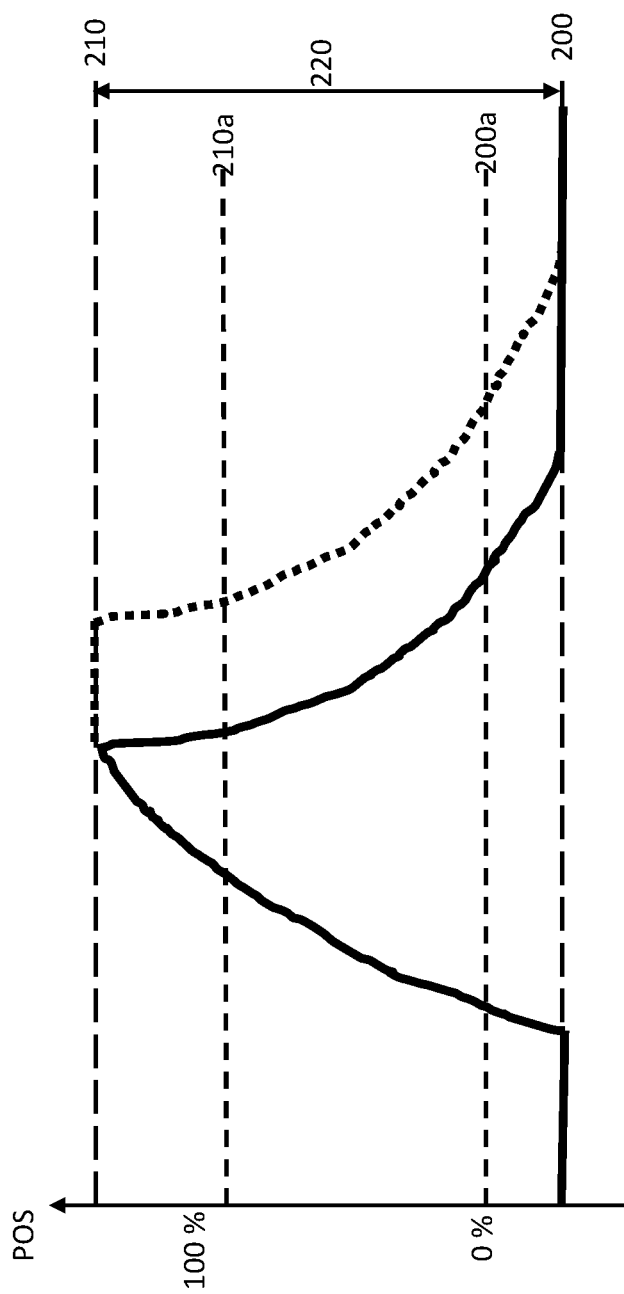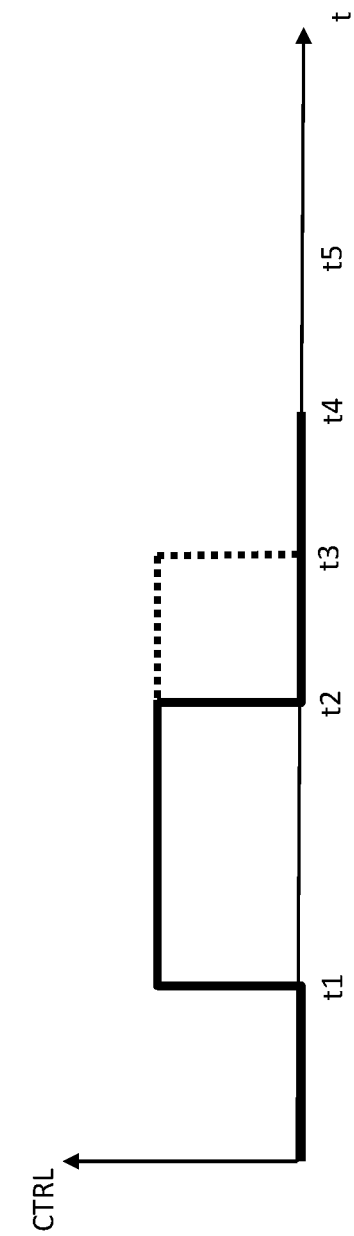
Fig. 3a
Fig. 3b

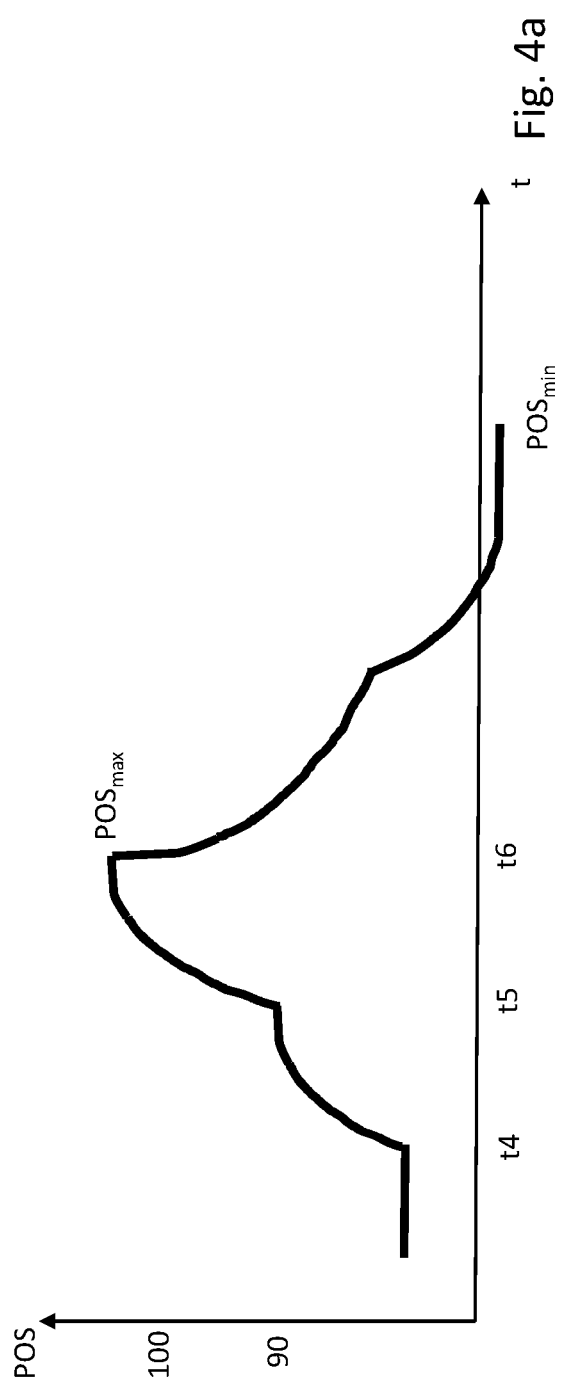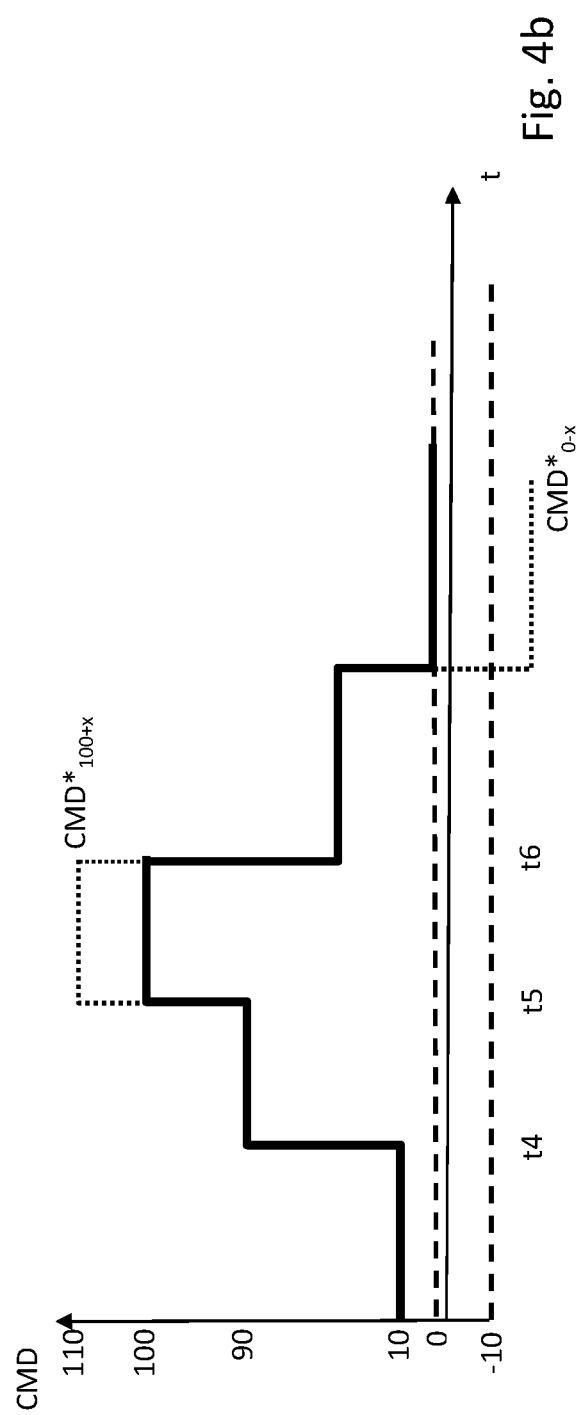

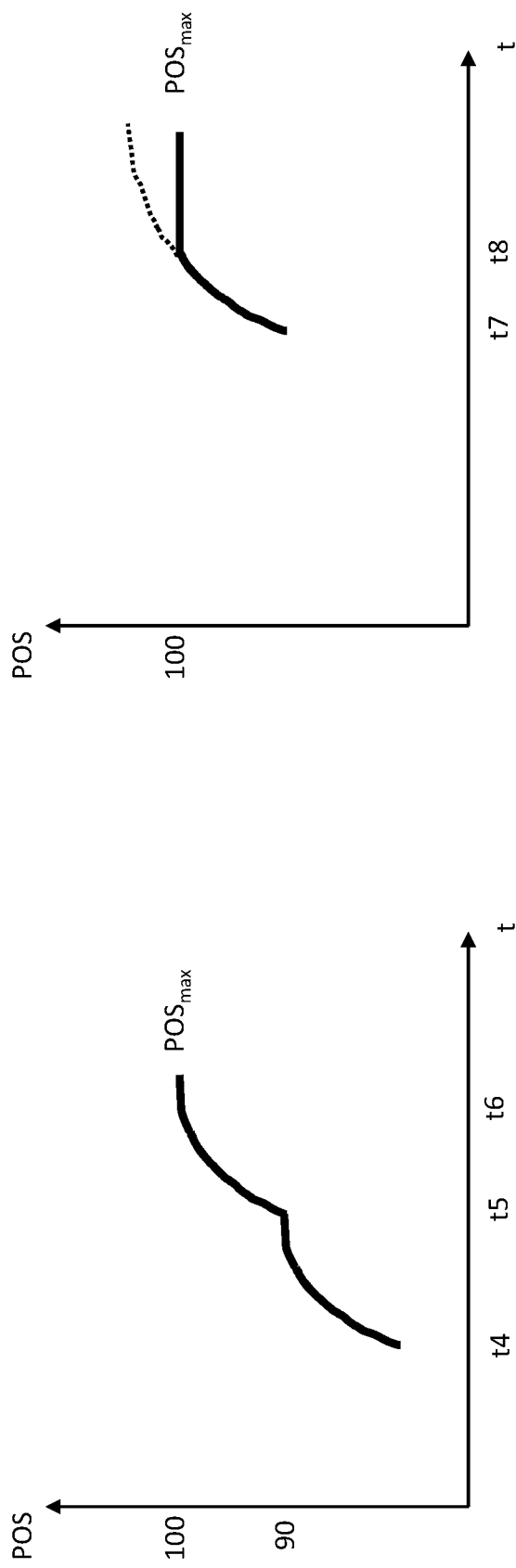
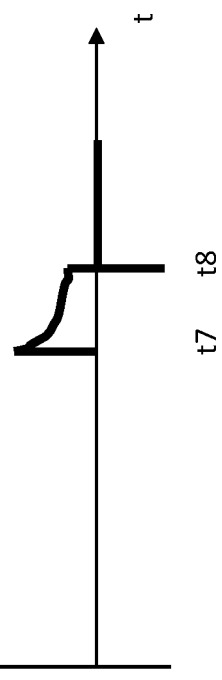
Fig. 5c
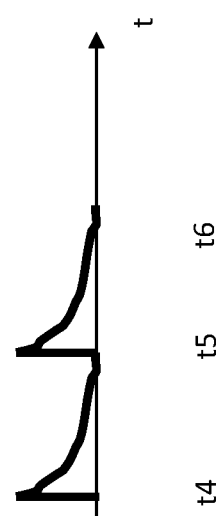
Fig. 5d
Fig. 5a
Fig. 5b

ADJUSTMENT OF STROKE END POSITIONS OF A PROCESS CONTROL VALVE

CROSS-REFERENCE TO RELATED APPLICATIONS

This application is a U.S. non-provisional application claiming the benefit of German Patent Application No. 10 2019 112 725.4, filed on May 15, 2019, which is incorporated herein by its entirety.

TECHNICAL FIELD

The disclosure relates to a method of adjusting stroke end positions of a process control valve. The disclosure further relates to a corresponding program code for execution on a valve control mechanism, to a valve control mechanism, and to a process control valve.

BACKGROUND

In the manufacture of process valves, individual components such as the valve housing and the drive are each subject to various tolerances. This applies in particular to the stroke end positions, which result from the connection of the drive to the valve housing and which slightly differ individually.

The adjustment of the stroke end positions of a process control valve at the factory or when commissioning a plant is often carried out by an automatic "tune function". To this end, microcontroller electronics in the control head/positioner is used to move the valve to the end positions. The fitting is then fully opened and fully closed. This is not possible during operation of a plant.

The same applies to the subsequent replacement of a process valve drive and/or a control head/positioner in a plant. Here, the stroke end positions must also be adjusted regularly.

However, since the adjustment of the stroke end positions cannot be carried out during the ongoing process operation, the replacement of a process valve in a plant regularly leads to additional downtime, which considerably exceed the actual assembly time.

The intervention in the regular operation of the plant is to be minimized as far as possible and the fluidic function of the plant is to be impaired as little as possible during the first installation or a later (re-) adjustment or the later replacement of a process valve.

SUMMARY

According to one exemplary disclosure, adjustment of the stroke end positions is carried out during operation of the plant. The operation of the plant does not have to be interrupted for the adjustment. An appropriate method of adjusting stroke end positions of a process control valve is provided.

A process control valve regularly includes a process valve having an actuator and a valve housing, and a valve control mechanism assigned to the process valve and a travel-measurement system.

According to one aspect, the valve control mechanism provides a first travel-measurement system final value and a second travel-measurement system final value in a storage unit. Predefined default values for the stroke end positions may be pre-allocated to the first travel-measurement system final value and the second travel-measurement system final value. The valve control mechanism is configured and set-up so as to continuously determine an actual position value from a travel-measurement system value acquired by the travel-measurement system, taking the first travel-measurement system final value and the second travel-measurement system final value into account.

According to a further aspect, the method comprises the recognition of a first stroke end position when the process control valve is fully closed, and the storage of the travel-measurement system value corresponding to the first stroke end position as the first travel-measurement system final value.

The method further comprises the recognition of a second stroke end position when the process control valve is fully open, and the storage of the travel-measurement system value corresponding to the second stroke end position as the second travel-measurement system final value.

The process control valve is part of a process plant, and the steps of the method are carried out during operation of the plant.

In other words, the valve is not proactively opened and closed for adjustment, which is usually in conflict with the normal processes and would disturb the ongoing operation of the plant. The valve control mechanism rather changes to a kind of monitoring mode for the adjustment, in which it waits until the valve is fully open or closed anyway due to the process.

According to an advantageous aspect, the first stroke end position may be recognized if the acquired travel-measurement system value is smaller than the provided first travel-measurement system final value.

In order not to overwrite the travel-measurement system final value unnecessarily often, it may be provided as an additional condition for the recognition of the final stroke position to wait until the process control valve is driven by a position set-point value so as to close completely. Preferably, the acquired travel-measurement system value is stationary.

Similarly, the second stroke end position may also be recognized if the acquired travel-measurement system value is greater than the provided second travel-measurement system final value. Advantageously, an additional condition may be that the process control valve is driven by a position set-point value so as to open completely. Preferably, an additional condition may be that the acquired travel-measurement system value is stationary.

According to a further advantageous aspect, the method may comprise the modification of a position set-point value by which the process control valve is driven. The modified position set-point value can be decreased by a defined value compared to the position set-point value when the position set-point value drives the process control valve so as to close completely. Similarly, the modified position set-point value can be increased by a defined value compared to the position set-point value provided that the position set-point value drives the process control valve so as to open completely. In other words, this advantageous aspect provides that in the adjustment mode, when the valve is fully opened or closed due to the process, the valve is driven such that the drive is controlled beyond the stored stroke end positions and moves up to the mechanical limit. The defined value may be selected so as to cover the tolerance interval resulting from the tolerance chain. In this way, the mechanically induced stroke end positions may be reliably recognized.

According to an advantageous aspect, the method can be terminated if upon driving using a modified reduced position set-point value, the resulting travel-measurement system value does not fall below the provided travel-measurement system final value, and if upon driving using a modified increased position set-point value, the resulting travel-measurement system value does no longer exceed the provided travel-measurement system final value. In this way, the adjustment mode is automatically exited when the mechanically induced stroke end positions have been recognized and registered.

According to a further advantageous aspect, the first and/or the second stroke end position can be recognized by the fact that in a derivation function of the actual position value, there is a discontinuous transition to a stationary value. Advantageously, the discontinuous transition may be recognized by a differentiating filter. This improves or simplifies the recognition/detection of the stroke end positions.

Furthermore, a program code is provided which comprises a plurality of instructions which during execution of the program code by a valve control mechanism cause the latter to perform the steps of the method according to the disclosure. Due to the program code, the method may also be integrated into existing valve control mechanisms.

Furthermore, a valve control mechanism is provided which is configured and set up so as to execute the method according to the disclosure, in particular wherein the valve control mechanism contains a microcontroller which executes the aforementioned program code.

Furthermore, a process control valve is provided which is configured and set up so as to execute the method according to the disclosure.

According to an advantageous aspect, the process control valve may comprise the aforementioned valve control mechanism.

BRIEF DESCRIPTION OF THE DRAWINGS

The features and aspects of the disclosure are explained in more detail below on the basis of examples embodiments and with reference to the figures, in which FIG. 3a shows an exemplary representation of a POS-time curve for a process control valve, FIG. 3b shows an exemplary representation of a CTRL-time curve for the process control valve, FIG. 4a shows an exemplary representation of a POS-time curve for a process control valve, FIG. 4b shows an exemplary representation of a CMD-time curve for the process control valve, FIG. 5a shows an exemplary representation of a POS-time curve for a process control valve, and FIG. 5b shows an exemplary representation of a time curve of a differentiating filter for the POS-time curve, FIG. 5c shows an exemplary representation of a POS-time curve for the process control valve, and FIG. 5d shows an exemplary representation of a time curve of a differentiating filter for the process control valve.

DETAILED DESCRIPTION

Figure 1:
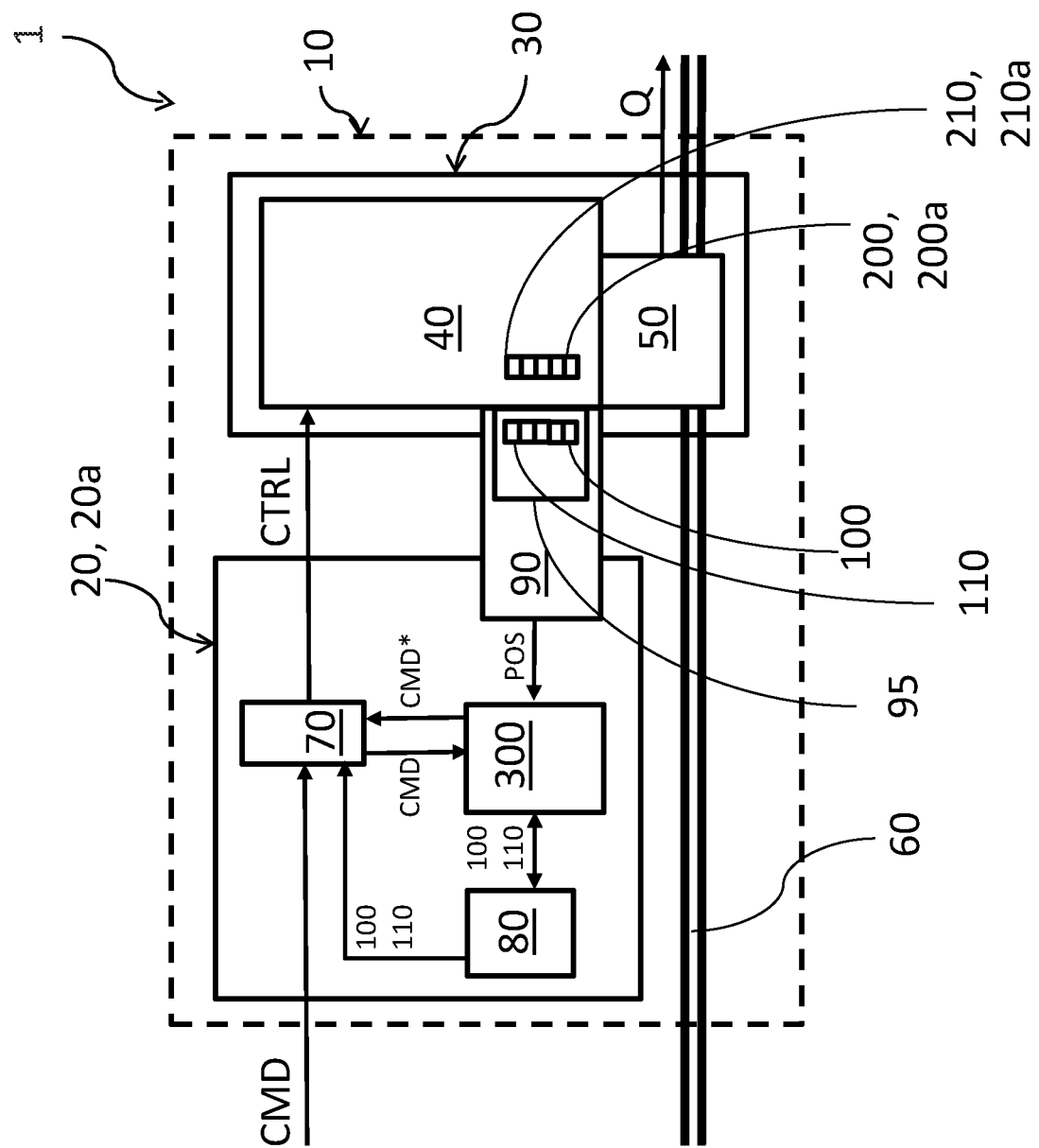
FIG. 1 shows a simplified representation of a process control valve having a control head.

FIG. 1 shows a simplified schematic representation of a process control valve 10 in a process plant 1, which comprises the valve control mechanism 20 and the process valve 30.

The process valve 30 comprises the actuator 40 and the valve housing 50. The process valve 30 may in particular be configured as a seat valve or as a diaphragm valve.

In particular, the actuator 40 may be actuated pneumatically, by an electric motor or electromagnetically. This depends on the local requirements, for example on the performance, explosion protection or also on the existing supply, for example with compressed air.

The valve housing 50 has a flow channel 60. The valve control mechanism 20 comprises the positioning system 70, the storage unit 80, and the travel-measurement system 90. The travel-measurement system 90 may also be part of the process valve 30. The travel-measurement system 90 comprises the travel sensor 95.

The valve control mechanism 20 is configured by way of example as a control head. A control head is used for an open/close operation. This means that in the case of a valve control mechanism 20a, only the control signals CTRL "open" (100%) or "close" (0%) are transmitted by the positioning system 70 to the drive of the process valve 30 or to the actuator 40.

In the production of process valves, individual components are subject to various tolerances. Important are, for example, the mechanically induced stroke end positions 200 or 210 for each process valve, which result from the connection of the drive to the valve housing.

The process valve 30 is fully closed at stroke end position 200 and it is fully open at stroke end position 210.

The predefined stroke end positions 200a and 210a are determined such that they are always within the stroke range 220 of the respective process valve 30, even when taking the stated tolerances into account. These (generic) predefined stroke end positions 200a, 210a thus constitute default values for the travel-measurement system final values 100, 110, which permit a sufficient functioning of the process control valve 10.

Later, the travel-measurement system 90 is adjusted individually such that the travel-measurement system final values 100, 110 of the travel-measurement system 90 correspond to the stroke end positions 200, 210 of the process valve 30.

According to the disclosure, such an adjustment is possible at any time. It is therefore no longer necessary to adjust a process control valve 10 before commissioning. Even if a process control valve 10 is replaced in a plant 1, for example due to wear, it is no longer necessary to adjust it before commissioning.

For this purpose, the valve control mechanism 20 includes a functionality for adjusting the stroke end positions 200, 210 during plant operation, which will be referred to as B-Tune 300 from now on. Preferably, B-Tune 300 is implemented as a software module, which is responsible in particular for the adjustment and the storage of the travel-measurement system final values 100, 110 in the storage unit 80.

The valve control mechanism 20 is configured and set up so as to continuously determine an actual position value POS from a travel-measurement system value acquired by the travel-measurement system 90, taking the first travel-measurement system final value 100 and the second travel-measurement final system value 110 into account.

The method according to the disclosure comprises the recognition of a first stroke end position 200 when the process control valve 10 is fully closed, and the subsequent storage of the travel-measurement system value corresponding to the first stroke end position 200 as the first travel-measurement system final value 100.

The method further comprises the recognition of a second stroke end position 210 when the process control valve 10 is fully open, and the storage of the travel-measurement system value corresponding to the second stroke end position 210 as the second travel-measurement system final value 110.

The process control valve 10 is part of a process plant 1. The steps of the process are performed during operation of the plant 1. Therefore, the plant operation does not have to be interrupted for adjustment.

The process control valve 10 is configured and set up so as to execute the process. The process is advantageously represented in a program code. The program code comprises instructions which upon execution of the program code in a valve control mechanism 20 cause the valve control mechanism to perform the method described above. The valve control mechanism 20 is configured and set up accordingly, e.g. it has a microcontroller. The microcontroller executes the program code.

The described method is also used in the further example embodiments.

Figure 2:
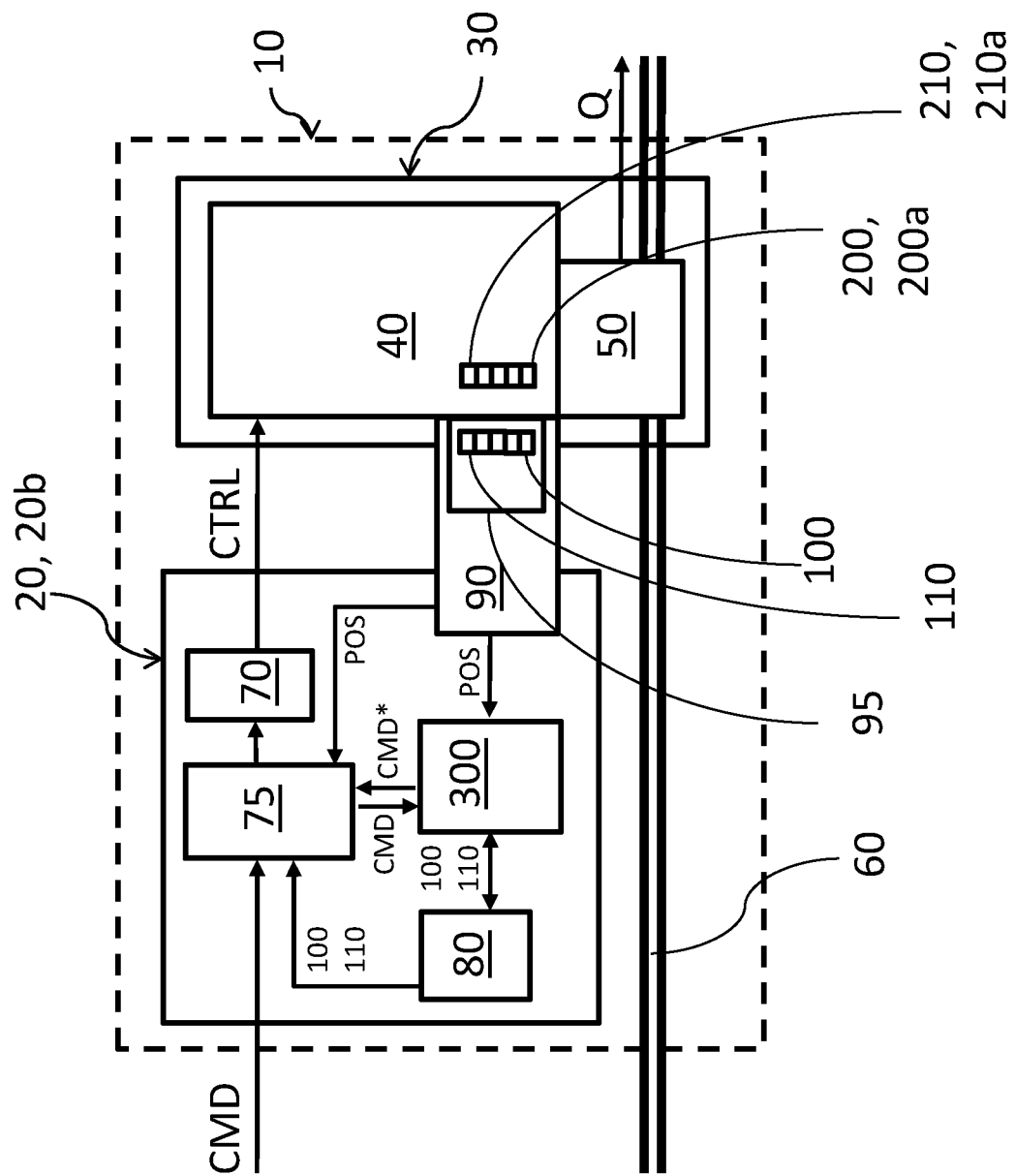
FIG. 2 shows a simplified representation of a process control valve having a positioner.

FIG. 2 shows a simplified schematic representation of a process control valve 10 having a positioning member 75, also referred to as positioner. The structure and the function substantially correspond to the structure and function shown in FIG. 1. Identical components and components/features having comparable functions have the same reference numerals. A repeated description is omitted.

A positioner is used for continuous or proportional operation. This means that with a valve control mechanism 20b using the positioning member 75, any control signals CTRL from 0% to 100% are sent by the positioning system 70 to the drive of the process valve 30 or to the actuator 40 as a control signal.

The positioner comprises in particular the functional groups composed of the travel sensor 90, the positioning system 70, and the valve control mechanism 20b. The travel sensor 90 measures the current positions of the valve. The valve control mechanism 20b continuously compares the current position (actual position value POS) with a position set-point value CMD specified via an interface (often a standard signal input) and feeds the result to the positioner.

If there is a system deviation, the positioning system 70 causes an appropriate correction of the actual position value POS.

In addition, a PID controller implemented in the valve control mechanism 20b may be integrated, by which, in addition to the actual position control, a process control (e.g. of level, pressure, flow rate, temperature, etc.) may also be carried out as cascade control. The process controller is integrated into a control loop. The valve position set-point value CMD is calculated from the process set-point value and the actual process value via the control parameters (PID controller). The process set-point value can be specified by an external signal.

FIG. 3a shows a simplified representation of a POS-time curve for the process control valve 10 of FIG. 1. The associated simplified representation of the CTRL-time curve is shown in FIG. 3b.

A control head is used as a valve control mechanism 20. The predefined stroke end positions 200a and 210a are stored in the storage unit 80 of the valve control mechanism 20a as default values at the beginning.

During the execution of B-Tune 300 during regular operation of the plant 1, the position set-point value CMD or the control signal CTRL for "open" (100%) is specified at any time t1.

At time t2, the actuator reaches the mechanically induced stroke end position 210. The travel-measurement system 90 detects the actual position value POS as a travel-measurement system final value 110. If the detection is successful, the actual position value POS is stored as a stroke end position 210 in the storage unit 80. In other words, the second stroke end position 210 is recognized if the process control valve 10 is driven by a position set-point value CMD so as to open completely, and if the acquired travel-measurement system value is greater than the provided second travel-measurement system final value 110. The stroke end position 210 is advantageously recognized if the acquired travel-measurement system value is stationary.

In the same way, the stroke end position 200 is stored in the storage unit 80. At time t2 or any later time t3, the position set-point value CMD or the control signal CTRL is set for "close" (0%). At time t4 or t5, the actuator reaches the mechanically induced stroke end position 200. The travel-measurement system detects the actual position value POS as a travel-measurement system final value 100. If the detection is successful, the actual position value POS is stored as a stroke end position 200 in the storage unit 80. In other words, the first stroke end position 200 is recognized when the process control valve 10 is driven by a position set-point value CMD so as to close completely and when the acquired travel-measurement system value is smaller than the provided first travel-measurement system final value 100. The stroke end position 200 is advantageously recognized when the acquired travel-measurement system value is stationary, i.e. does not change any more.

It is not important whether the second stroke end position 210 or the first stroke end position 200 is recognized first. As soon as both stroke end positions 200, 210 have been stored, the process control valve 10 is adjusted and B-Tune 300 is terminated.

FIG. 4a shows a simplified representation of an exemplary POS-time curve for the process control valve 10 of FIG. 2. The corresponding simplified representation of the CMD-time curve is shown in FIG. 4b.

A positioner is used as a valve control mechanism 20. The predefined stroke end positions 200a and 210a are stored in the storage unit 80 of the valve control mechanism 20b as default values at the beginning.

During the execution of B-Tune 300 during regular operation of the plant 1, whenever the positioning member 75 receives a position set-point value CMD of 0% or 100%, a control signal CTRL is specified from a modified position set-point value CMD* of (0–X) % or (100+X) %. Here, the value X is greater than the largest possible tolerance width. In other words, the following queries take place in B-Tune: If "0%<CMD<100%", then CMD*=CMD; If "CMD=100%", then CMD*=CMD+X; If "CMD=0%", then CMD*=CMD−X. As long as the actual position value POS reaches values beyond 0% or 100%, the actual position value POS is stored as the new travel-measurement system final values 100 or 110 in the storage unit 80. As soon as the actual position value POS no longer falls below or exceeds 0% or 100% during this CMD* specification, the process control valve 10 is "adjusted" and the B-tune "mode" with the internal CMD* specification is terminated.

In other words, the procedure comprises the modification of a position set-point value CMD by which the process control valve 10 is driven. The modified position set-point value CMD* is decreased by a defined value X compared to the position set-point value CMD, provided that the position set-point value CMD drives the process control valve 10 so as to close it completely. The modified position set-point value CMD* is increased by a defined value X compared to the position set-point value CMD, provided that the position set-point value CMD drives the process control valve 10 so as to open it completely. In this way, the stored or predefined stroke end positions 200a, 210a are passed over in a controlled manner to determine the mechanically induced stroke end positions 200, 210.

The method is terminated if upon driving using a modified reduced position set-point value (CMD*), the travel-measurement system value resulting from the reduced position set-point value CMD* does not fall below the provided travel-measurement system final value 100, and if upon driving using a modified increased position set-point value CMD*, the provided travel-measurement system final value 110 is not exceeded by the travel-measurement system value resulting from the increased position set-point value CMD*.

FIGS. 4a, 4b show an exemplary B-tune procedure. At time t4, a position set-point value CMD of 90% is specified. Since it is neither a specification of 100% nor a specification of 0%, this CMD is sent to the actuator 40 as a control signal CTRL.

At time t5, a position set-point value of 100% is specified. Since it is a 100% specification, CMD*100+X is generated and sent as a control signal CTRL to the actuator 40, which reaches the required position at time t6. The actual position value POS measured by the travel-measurement system 90 is now stored as a stroke end position 210 in the storage unit 80.

This takes place repeatedly as long as actual position values POS at a position set-point value CMD of 100% are greater than the stroke end position 210 stored in the storage unit 80.

The same applies to the specification of a position set-point value CMD of 0%.

FIGS. 5a and 5c show simplified representations of the POS-time curve. The associated simplified representations of the time curve of the differentiating filter are shown in FIGS. 5b and 5d. FIG. 5a, 5b essentially correspond to FIG. 4a, 4b.

In the storage unit 80 of the valve control mechanism 20b, travel-measurement system final values 100 and 110 for predefined stroke end positions 200a, 210a are stored as default values.

The storage of the actual position values POS as stroke end values 200, 210 is always carried out when during the regular position control operation (for example at time t8) a discontinuous transition of the derivation function of the actual position value POS to a stationary value occurs. The detection of the transition is performed using a differentiating filter.

At times t5 or t7, the movement of the seal body begins in the direction of 100% in accordance with the corresponding control signal CTRL.

In FIG. 5a, at time t6, the physical stop of the actuator is reached at the same time as the maximum actual position value POSmax, i.e. the actual position value POS approaches the maximum actual position value POSmax tangentially in the curve. The associated characteristics in FIG. 5b show the corresponding decrease in the slope of the POS curve.

In FIG. 5c, the physical stop of the actuator is reached at time t8, i.e. the POS curve changes to a horizontal characteristic with a kink. This kink is visible in the associated characteristic in FIG. 5d, which depicts the derivation function of the actual position value POS as a discontinuous transition to a stationary value.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A method of adjusting stroke end positions of a process control valve; wherein the process control valve comprises a process valve having an actuator and a valve housing, and wherein the process control valve comprises a valve control mechanism associated with the process valve, and wherein the process control valve comprises a travel-measurement system configured to acquire a travel-measurement system value, wherein the valve control mechanism comprises a storage unit which provides a first travel-measurement system final value and a second travel-measurement system final value and wherein the valve control mechanism is configured and set up so as to continuously determine an actual position value from the travel-measurement system value acquired by the travel-measurement system, taking the first travel-measurement system final value and the second travel-measurement system final value into account; and wherein the method comprises the following steps:
   a. recognizing a first stroke end position when the process control valve is fully closed,
   b. storing the travel-measurement system value corresponding to the first stroke end position as the first travel-measurement system final value,
   c. recognizing a second stroke end position when the process control valve is fully open; and
   d. storing the travel-measurement system value corresponding to the second stroke end position as the second travel-measurement system final value;
   wherein the process control valve is a component of a process plant and the steps of the method are carried out during operation of the process plant.

2. The method according to claim 1, wherein the first stroke end position is recognized when an acquired travel-measurement system value is smaller than the provided first travel-measurement system final value.

3. The method according to claim 1, wherein the second stroke end position is recognized when an acquired travel-measurement system value is greater than the provided second travel-measurement system final value.

4. The method according to claim 1, the method comprising the following step: modifying a position set-point value by which the process control valve is driven, wherein a modified position set-point value is reduced by a defined value compared to the position set-point value, provided that the position set-point value drives the process control valve so as to close completely, and/or wherein the modified position set-point value is increased by a defined value compared to the position set-point value, provided that the position set-point value drives the process control valve so as to open completely.

5. The method according to claim 4, wherein the method is terminated if upon driving using the modified reduced position set-point value, a resulting travel-measurement system value does not fall below the provided first travel-measurement system final value, and if upon driving using the modified increased position set-point value, the resulting travel-measurement system value does not exceed the provided second travel-measurement system final value.

6. The method according to claim 1, wherein the first and/or the second stroke end position is acquired if a discontinuous transition to a stationary value in a derivative function of the actual position value is recognized.

7. The method according to claim 1, wherein the first stroke end position is recognized when an acquired travel-measurement system value is smaller than the provided first travel-measurement system final value when the process control valve is driven by a position set-point value so as to close completely, and when the acquired travel-measurement system value is stationary.

8. The method according to claim 1, wherein the second stroke end position is recognized when an acquired travel-measurement system value is greater than the provided second travel-measurement system final value when the process control valve is driven by a position set-point value so as to open completely, and when the acquired travel-measurement system value is stationary.

9. The method according to claim 1, wherein the first and/or the second stroke end position is acquired if a discontinuous transition to a stationary value in a derivative function of the actual position value is recognized, and wherein recognition of the discontinuous transition is carried out using a differentiating filter.

* * * * *